(12) United States Patent
Manthey (10) Patent No.: US 10,664,760 B2
(45) Date of Patent: May 26, 2020

(54) SPACE-LIKE COMPUTATIONS IN COMPUTING DEVICES

(71) Applicant: Michael Manthey, Crestone, CO (US)

(72) Inventor: Michael Manthey, Crestone, CO (US)

( * ) Notice: Subject to any disclaimer, the term of this patent is extended or adjusted under 35 U.S.C. 154(b) by 1620 days.

(21) Appl. No.: 14/732,590

(22) Filed: Jun. 5, 2015

(65) Prior Publication Data

US 2016/0148110 A1    May 26, 2016

Related U.S. Application Data

(63) Continuation-in-part of application No. PCT/US2015/018734, filed on Mar. 4, 2015.

(60) Provisional application No. 61/947,924, filed on Mar. 4, 2014.

(51) Int. Cl.
*G06N 5/04* (2006.01)
*G06N 3/02* (2006.01)

(52) U.S. Cl.
CPC .............. *G06N 5/048* (2013.01); *G06N 3/02* (2013.01)

(58) Field of Classification Search
CPC ................................. G06N 5/048; G06N 3/02
See application file for complete search history.

(56) References Cited

U.S. PATENT DOCUMENTS

2206/0149582    7/2006  Hawkins

OTHER PUBLICATIONS

Zhou, Hai-ying, Feng Wu, and Kun-mean Hou. An event-driven multi-threading real-time operating system dedicated to (Year: 2008).*
Weyns, Danny, et al. "Environments for multiagent systems state-of-the-art and research challenges." International (Year: 2004).*
Manthey, Michael. "Distributed computation as hierarchy." arXiv preprint cs/9809019 (1998). (Year: 1998).*
International Search Report and Written Opinion for related international patent application PCT/US2016/035885, dated Aug. 24, 2016.
Michael Manthey, Distributed Computation as Hierarchy, Computer Science Dept., Aalborg University, Publication (on-line) Feb. 1, 2008, pp. 17, https://arxiv.org/pdf/cs/9809019.
Yixin Diao et al., A Control Theory Foundation for Self-Managing Computing Systems, Computer Science Dept., Columbia University, RC23646 (W0506-124), Jun. 29, 2005, pp. 3, 15-19.
Wei Jen Ye et al., Hierarchical Tracing of Concurrent Programs, In Proc 3rd Irvine Software Symposium (ISS '93), 1993, pp. 1-12.

* cited by examiner

*Primary Examiner* — Vincent Gonzales
*Assistant Examiner* — Kevin W Figueroa
(74) *Attorney, Agent, or Firm* — Quarles & Brady LLP (57) ABSTRACT

Computing systems and computer-implemented methods for specifying distributed computation. The systems and methods utilize computer-readable code causing a computer to engage in reversible, self-organizing hierarchical space-like computation that create information. At least one sensor and effector adapted to react to an environment external to the computer/computing system can create information based on an input from or "experience" with that environment.

21 Claims, 2 Drawing Sheets

FIG. 1

FIG. 2

SPACE-LIKE COMPUTATIONS IN COMPUTING DEVICES

CROSS-REFERENCE TO RELATED APPLICATIONS

This application is a continuation-in-part and claims the benefit of International Application No. PCT/US2015/018734, filed Mar. 4, 2015, entitled "DISTRIBUTED COMPUTING SYSTEMS AND METHODS," and claiming the benefit of U.S. Provisional Pat. App. Ser. No. 61/947,924, filed Mar. 4, 2014, and entitled "Artificial Intelligence System and Methods," the entire contents of both applications being incorporated herein by reference.

FIELD OF INVENTION

The invention relates generally to systems and methods for operating computational environments on computing devices, and more particularly to systems and methods for configuring computing devices to perform non-Turing-limited computations.

BACKGROUND

Computation, whether understood as explicit executions on hardware or more abstractly as literal sequences of otherwise unspecified events, is inherently time-like, in that at its very core, each step is fundamentally irreversible. Sequential computation by its very nature consumes information, and this includes so-called parallel processing, or parallelism—the organized execution of multiple copies of one or more sequential processes. These are facts supported by key mathematical theorems by Alan Turing (1920-40's) and Claude Shannon (1948++).

The present disclosure presents a new kind of computation—Space-like Computation—that is the conceptual opposite of time-like computation. Space-like computation is reversible (i.e., wave-like) and creates information. Space-like computations rest on novel mathematics, which show that space-like computations are in principle different from traditional sequential (and parallel) computations.

As a result, there is no inbuilt sense of "time" in a space-like computation, although there is plenty of change. This change can either be viewed as the evolution of a complex waveform (representing the activity spectrum of the computation) or as the dynamics of a population of discrete concurrent bit-flips—the two views are EXACTLY equivalent, courtesy of another theorem, Parseval's Identity (1799), and are explained further below.

Parseval's Identity states that the projection of a function F onto an n-dimensional orthogonal space is the Fourier decomposition of F. Parseval's Identity is a generalization of the Pythagorean theorem to n dimensions. In the n-dimensional coordinate system, F's current value corresponds to a hyper-hypotenuse in an n-dimensional hyper-cube, and the projection breaks that hyper-hypotenuse down into the various pieces along each of the dimensions that go into its construction.

To construct an n-dimensional volume, begin with an ordinary plane right triangle with unit sides a and b. Reflect this triangle on its hypotenuse, forming a rectangle with sides a and b, area ab, and diagonal $d=sqrt(a^2+b^2)$. Next, lift this rectangle vertically (length c) to make a three-dimensional (3D) volume abc. Its diagonal is $d=sqrt(a^2+b^2+c^2)$ and this sum-of-squares symmetry continues as we make a 4D volume, then 5D, etc.

At the same time, going back to the starting right triangle, we can also express the sides a and b as $a=d \cos \theta$ and $b=d \sin \theta$, where $\theta$ is the angle between a and the hypotenuse. Substituting these sine and cosine equivalents for a, b, c, . . . up through the dimensions will yield, for the n-dimensional hypotenuse (which is the current value of the function F, whose projection we began with), a sum of sines and cosines, i.e., Fourier's world.

So the world of waves and the world of orthogonal coordinate systems are the same world. It is in the latter that we will connect to computation. The connection is this: let each dimension correspond to the state of some process, where all these processes a, b, c, . . . , ab, ac, . . . , abc, . . . are notionally independent (i.e., orthogonal), though interacting otherwise freely and concurrently. Further, let each of these processes a, b, c, . . . , ab, ac, . . . , abc, . . . be in one of two possible states at any particular time.[1] An analysis of the process-state evolution in such a system reflects that some or all of the processes change their state at some frequency, with the processes that are interactions (i.e., m-vectors) changing at a lower frequency than their constituent processes. The processes can be seen to separate into frequency bands according to the number of bits of state (i.e., m): the high frequency bands contain the more frequently-changing individual, one-dimensional processes a, b, c, . . . , revealing short-term, high-resolution data about the system; low frequency bands correspond to long-term symmetries and global developments, represented by processes of increasing dimensions (e.g., ab, abc, abcd, etc.).

[1] In the geometric (Clifford) algebra over Z3={0, 1, -1} used here, 1-vectors are processes with one bit of state, ±1, and an m-vector thus has m bits of state. For concurrent processes a, b, we write a+b; when a, b interact we write ab. ab too is a process with two bits of state and an external appearance±1.

Via Parseval's Identity, the frequency bands correspond to expressions in the algebra, which in turn correspond to collections of interactions. The Fourier decomposition of this system can be said to perform cross-summation of these frequency bands. The relationship of these cross-summed Fourier bands to the frequencies of change of the individual processes in the system can be analogized to the relationship between qualia—the feeling or experience of a sensation—and perception (e.g., the sum of all experiences of redness vs. the optical light frequencies detected by individual retinal cells).

A space-like computation S is characterized by the following six properties.

First, a space-like computation is distributed, which means that the entire system, consisting of a potentially very large number of concurrent, independent but interacting entities comprised of one or more processes, exhibits coherent global behavior with little or no centralized control. The exact technological criteria for how to design and build distributed systems in general have proven elusive, which lacuna the present invention fills.

Second, a space-like computation is self-organizing, meaning that given some method and the necessary inputs from a surrounding environment that includes the space-like computation (herein, the "surround"), the components of the space-like computation will—over time—assemble these inputs into a coherent entity of discrete units (i.e., other entities, individual processes, or a combination thereof) that interacts with that surround in a stable fashion to accomplish the method. How to design self-organizing computations is a current topic of high-profile research, which the present invention advances.

Third, a space-like computation is hierarchical, meaning that the self-organization includes the creation of new discrete units that represent combinations of the initial units— and combinations of those combinations, and so on—which new units are then subjected to the self-organizational method. Hierarchy is a universal and well-proven technological tool to control conceptual complexity, a tool whose use is found across the industry, from programming languages to databases to communication protocols.

Fourth, a space-like computation is not Turing-limited, meaning that a true space-like computation cannot be simulated by a universal Turing machine, which is by definition limited to sequential computations (including parallelism). This is the topic of the Coin Demonstration (below), which gives an easily understood counter-example. It is widely thought that Turing's theorems prove that all computation is sequential in principle, thus the present disclosure contradicts established norms.

Fifth, a space-like computation is meaningless unless connected to, and interacting with, a surround, because if it is unconnected it cannot grow. As opposed, say, to a sequential computation that computes the value of $\pi$, which computation presumably would find genuine meaning in its solitary endeavor, its world being complete.

Sixth, a space-like computation uses a broadcast/listen communications discipline. That is, the space-like computation broadcasts its own state and listens (i.e., reacts) accordingly to other broadcasted states. The reason for this is that the alternative, a request/reply discipline, is inherently functional in character, since it implements $y=f(x)$: "Request that f do its thing on x and reply with the result." But one man's y is another man's x, so $z=g(y)$ is also a possibility. But then $g(y)=g(f(x))$, and the requirement first-do-f-then-do-g in order to obtain z is inherently sequential and time-like. This is how contemporary computer systems are organized. In contrast, a space-like computation assembles the steps in its sequential processes on-the-fly, as described further below. Contemporary technology largely ignores broadcast/listen protocols because they do not fit the dominant $y=f(x)$ (i.e., sequential) organizational paradigm.

The following Coin Demonstration clarifies the fundamental reasoning underlying these concepts:

Act I. A man stands in front of you with both hands behind his back. He shows you one hand containing a coin, and then returns the hand and the coin behind his back. After a brief pause, he again shows you the same hand with what appears to be an identical coin. He again hides it, and then asks, "How many coins do I have?"

The best answer at this point is that the man has "at least one coin", which implicitly seeks one bit of information, and two possible but mutually exclusive states: state1="one coin," and state2="more than one coin."

One is now at a decision point—if one coin then do X else do Y—and exactly one bit of information can resolve the situation. Said differently, when one is able to make this decision, one has ipso facto received one bit of information.

Act II. The man now extends his hand and it contains two identical coins.

Stipulating that the two coins are in every relevant respect identical to the coins we saw earlier, we now know that there are two coins, that is, we have received one bit of information, in that the ambiguity is resolved. We have now arrived at the demonstration's dramatic peak:

Act III. The man asks, "Where did that bit of information come from?"

The bit originates in the simultaneous presence of the two coins—their co-occurrence—and encodes the now-observed fact that the two processes, whose states are each one of the coins, do not exclude each other's existence when in said states. Furthermore, the states are simultaneous and independent, and therefore indistinguishable in terms of time (i.e., sequence).

Thus, there is information in (and about) the environment that cannot be acquired sequentially, and true concurrency therefore cannot be simulated by a Turing machine. Can a given state of process a exist simultaneously with a given state of process b, or do they exclude each other's existence? This is the fundamental distinction.

More formally, we can by definition write $a+a'=0$ and $b+b'=0$ ('=not=minus), meaning that (process state) a excludes (process state) a', and (process state) b excludes (process state) b'. Their concurrent existence can be captured by adding these two equations, and associativity gives two ways to view the result. The first is:

$$(a+b')+(a'+b)=0$$

which is the usual excluded middle: if it's not the one, then it's the other. This arrangement is convenient to our usual way of thinking, and easily encodes the traditional one/zero (or 1/1') distinction. The second view is:

$$(a+b)+(a'+b')=0$$

which are the two superposition states: either both, or neither. That said, technically there are no superpositions of a/a' and b/b' as one-dimensional processes; rather, they are exclusionary distinctions. Superposition first emerges at the second level of processes (i.e., ab) via the distinction exclude vs. co-occur.

The Coin Demonstration shows that by its very existence, a 2-co-occurrence like a+b contains one bit of information. Co-occurrence relationships are structural, or space-like, by their very nature. This space-like information (as opposed to time-like information) ultimately forms the structure and content of the Fourier bands (e.g., all 2-vectors). As described above, sets of m-vectors—{xy}, {xyz}, {wxyz}, ... —are successively lower undertones of the concurrent flux at the system boundary $x+y+z+\ldots$, and constitute a simultaneous structural and functional decomposition of that flux into a hierarchy of stable and meta-stable processes. The lower the frequency, the longer-term its influence.

But where do these m-vectors come from?

Act IV. The man holds both hands out in front of him. One hand is empty, but there is a coin in the other He closes his hands and puts them behind his back. Then he holds them out again, and we see that the coin has changed hands. He asks, "Did anything happen?"

To the above two concurrent exclusionary processes a, b we now apply the co-exclusion inference, whose opening syllogism is: if a excludes a', and b excludes b', then (a+b') excludes (a'+b) (or, conjugately, a+b excludes a'+b'). The co-exclusion inference's conclusion is: therefore, ab exists. The reasoning is that we can logically replace the two one-bit-of-state processes a, b with one two-bits-of-state process ab, since what counts in processes is sequentiality, not state size, and exclusion births sequence (here, in the form of alternation between the two complementary states). That is, the existence of the two co-exclusions (a+b')|(a'+b) and (a+b)|(a'+b') contains sufficient information for ab to be able to encode them, and therefore, logically and computationally speaking, ab can rightfully be instantiated.

We write $\delta(a+b')=ab=-\delta(a'+b)$ and $\delta(a+b)=ab=-\delta(a'+b')$, where $\delta$ is a co-boundary operator (analogous to integration in calculus). Differentiation is the opposite: $\delta(ab)=a+b$. A fully realized ab is, we see, comprised of two conjugate co-exclusions, a sine/cosine-type relationship. Higher grade operators abc, abcd, . . . are constructed similarly: δ(ab+c)= abc, δ(ab+cd)=abcd, etc. This is the core of the present self-organization method.

We can now answer the man's question, Did anything happen? We can answer, "Yes, when the coin changed hands, the state of the system rotated 180 degrees: ab(a+b') ba=a'+b." We see that one bit of information ("something happened") results from the alternation of the two mutually exclusive states. The transition δ(a+b)=ab is in fact the basic act of perception, called the first perception, subsequent meta-perceptions being derivative.

The presently described systems and methods implement space-like computations on computing devices, in which the processes of the computations carrying the above-described semantics, because the processes are based on co-exclusion.

SUMMARY

The present disclosure provides systems and methods for configuring a computational environment, containing computing devices, to implement space-like computations. Thus, embodiments herein relate to computer-implemented methods and systems of distributed computation that include executing computer readable code to cause a computing device to engage in reversible, self-organizing hierarchical space-like computations, which create information and are not sequentially bound. Other features and advantages of the invention will be apparent from the following description and the claims.

In one described implementation, a computing device is configured to implement a space-like computation using a plurality of concurrent threads that are each activated based on the occurrence, co-occurrence, or exclusion of states belonging to other of the concurrent threads. The device includes a plurality of two-state sensors that each sense a phenomenon within a surround that includes a tuple space, and each produce a binary signal indicating whether the sensed phenomenon is present in or absent from the tuple space. The device further includes one or more effectors configured to produce an effect on the surround, wherein for each effector at least one of the plurality of sensors senses the effect of the effector on the surround. The device further includes a plurality of Actions each having an external state, a level, and a grade, and being configured to execute a co-exclusion of two (or more, in principle) of the concurrent Actions, the external state being determined at least in part by the states of one or more of the sensors, the level representing the number of the co-exclusions beneath the action in the hierarchy, and the grade representing the number of sensors whose states determine the external state of the action. The plurality of actions are arranged in a hierarchy wherein each of the plurality of actions is a node in the hierarchy.

The computing device may further include one or more Corms each configured to instantiate, on one or more levels of the hierarchy, at least one Event Window configured to detect a co-exclusion between two of the plurality of Actions and return the co-exclusion to the Corm that instantiated the event window. The Corms may be further configured to, responsive to receiving, from one of the at least one event window, the co-exclusion of a first Action and a second Action of the plurality of Actions, instantiate a new action in the plurality of Actions by: connecting the nodes of the first Action and the second Action as child nodes of the node of the new Action; setting the external state of the new Action according to the external states of the first and second Actions; and, setting the grade of the new Action based on the grades of the first Action and the second Action. Each of the one or more Corms may be further configured to instantiate the new Action only if the first Action does not share any of the plurality of sensors with the second Action. The Corm that instantiates the new Action may emit a tuple indicating the new Action is one of one or more top nodes of the hierarchy, the one or more top nodes being nodes that are not child nodes of any other of the nodes, and may further remove any tuples that indicate either of the child nodes of the new Action is one of the top nodes. The Corm may set the grade of the new Action based on the grades of the first Action and the second Action as follows: the cCorm instantiates the new Action with grade 1 when the first Action has grade 0 and the second Action has grade 1; the Corm instantiates the new Action with grade 2 when the first Action has grade 1 and the second Action has grade 1; the Corm instantiates the new Action with grade 3 when the first Action has grade 1 and the second Action has grade 2; the Corm instantiates the new Action with grade 1 when the first Action has grade 2 and the second Action has grade 2; the Corm instantiates the new Action with grade 1 when the first Action has grade 2 and the second Action has grade 3; and the Corm instantiates the new Action with grade 2 when the first Action has grade 3 and the second Action has grade 3; any other combination of the grades of the first Action and the second Action result in the new Action not being instantiated (in the preferred implementation)

A bottom level of the hierarchy may include either or both of: one or more of the sensors; and one or more of the effectors. The plurality of Actions may be arranged in the hierarchy in order to carry out one or more goals, the one or more goals modifying the space-like computation from a current state to a goal state based on one or more impulses in the surround, the plurality of Actions propagating each of the one or more impulses upward through the hierarchy and each of the one or more goals downward through the hierarchy, one or more of the plurality of Actions being configured to cause one or more of the effectors to produce the corresponding effect on the surround. The computing device may use co-exclusion between pairs of sensors and pairs of actions to automatically self-organize the plurality of actions into one or more subsumption architectures that respond to the surround.

Each of the one or more impulses is introduced from the surround to the space-like computation as an inversion of the state of a receiving sensor of the plurality of sensors, and the plurality of Actions carry out the goal by, upon introduction of the one or more impulses, updating their external states as needed to: perform a bubble up process that communicates the states of one or more of the plurality of sensors from a bottom level of the hierarchy upward to at least one level of the hierarchy higher than the bottom level, the bubble up process creating a trail for each of the one or more impulses, the trail comprising the Actions that updated their external states while communicating the states of the one or more of the plurality of sensors upward; and, perform a trickle down process that communicates, by retracing the trail of the bubble up process, one or more subgoals from one or more levels of the hierarchy higher than the bottom level downward to the one or more actions that cause the one or more effectors to produce the effect as identified by the corresponding subgoal, the one or more subgoals together forming the goal.

The nodes of the hierarchy include parent nodes, child nodes to the parent nodes, and top nodes that are parent nodes and are not child nodes, and the threads associated with each one of the Actions are arranged in a plurality of sets. A first set may include threads that perform the bubble up process by: detecting a change occurring in one or more of the sensors or in one or more originating Actions of the plurality of Actions, the one or more originating Actions being at a level of the hierarchy below the Action and being the first of the plurality of Actions to detect the inversion of the state of the receiving sensor; updating the external state of the action according to the change; and, if the node of the Action is one of the child nodes, communicating the change upward to the Action of the node's parent node. A second set may include threads that perform a distributed back-chaining process which, if the Action is not grounded, adds to a tree of potential causal links from the originating Action to one of the Actions that is grounded and has the same level as the originating Action, the tree including zero, one, or more links to other Actions of the plurality of Actions, the other Actions being ungrounded and having the same level as the originating Action. A third set may include threads that, provided the Action is grounded, perform the trickle down process by: detecting, from one of the levels of the hierarchy above the Action, a first of the subgoals that identifies the Action; splitting the first subgoal into second and third subgoals; communicating the second subgoal to one of the child nodes and the third subgoal to the other of the child nodes; and, instigating further execution of any (back-) chain that links to the Action and is waiting for the Action to execute. One or more of the co-exclusions may pertain to an element of the surround and, when one of the one or more impulses relates to the element, the one or more originating Actions contain the threads that are subject to the co-exclusions of the element, which one or more originating Actions then initiate the bubble up process.

The goal state of the space-like computation may be connected to the current state of the space-like computation at an intersection of a vertical aspect with a horizontal aspect, the vertical aspect comprising the bubble up process and the trickle down process, and the horizontal aspect being determined by the distributed back-chaining process. The horizontal aspect may correspond to one of the levels of the hierarchy.

In the distributed back-chaining process, a first of the Actions, which is not grounded, which comprises a first of the co-exclusions that includes a first of the plurality of sensors and the receiving sensor of a first of the one or more impulses, and which has the receiving sensor of the first impulse in a first of its child nodes, may use its second set of threads to issue a first new impulse of the one or more impulses, the first new impulse identifying the first sensor as the receiving sensor for the first new impulse; and a second of the actions, which has the same level as the first action, and which comprises a second of the co-exclusions that includes the first sensor and a second of the plurality of sensors: detects the first new impulse; adds to the tree by allowing the first action to link to it; and, if the second action is not grounded, uses its second set of threads to issue a second new impulse of the one or more impulses, the second new impulse identifying the second sensor as the receiving sensor of the second new impulse. The distributed back-chaining process may repeat the steps of the second action using other of the plurality of actions until the most recent of the new impulses is detected by one of the actions that is grounded. The distributed back-chaining process may create a plurality of backward chains of causal links between pairs of the plurality of Actions, the plurality of backward chains forming the tree, and execution of each of the backward chains is kept in abeyance until the one or more causally prior subgoal states required by the backward chain is issued by one of the actions that is grounded and has a higher level than the actions of the backward chain. When the node of the first action is not one of the top nodes, the first action performs the bubble up process by issuing one of the impulses that triggers the distributed back-chaining process for the actions in the next higher level of the hierarchy; each of the actions whose node is one of the top nodes performs the trickle down process by converting one or more of the one or more impulses into one or more of the one or more goals, and communicating the one or more of the one or more goals to the child nodes of the action. See, for example, the appended TLinda code.

The computing device may be configured to perform a recall operation in response to a request from a user of the computing device for a fact known to the space-like computation, in which recall operation: the computing device instantiates a devoted event window, the devoted event window containing the fact; and the computing device generates a recall impulse as one of the impulses, the recall impulse setting the goal state such that the bubble up process produces one or more Relevance indicators that ground one or more of the first actions. The space-like computation may discover novel processes by using the devoted event window to generate one or more new subgoals, eg. related to the recalling of the fact.

The space-like computation may implement an avatar structure that represents a human user in a virtual world, in which space-like computation the plurality of Actions comprise a plurality of system-supplied Actions that implement the avatar structure and are supplied to the space-like computation by a system designer, the sensors and the effectors that are contained in the plurality of system-supplied Actions comprise an interface to the virtual world in which the avatar structure operates, one or more of the impulses are passed into the space-like computation by the user, and the avatar structure is anchored to the public or personal identity of the user.

The computing device may be further configured to detect a pattern in the space-like computation that indicates a set of processes that is locked in a closed cyclic pact, typically a dead- or live-lock, identify the Actions participating in the pact, relieve the pact by temporarily removing the subgoals and the impulses on which the Actions participating in the pact are operating, and reestablish the removed subgoals and impulses after a fitting period of time.

Each of the plurality of Actions may further have a name that is known to the space-like computation and unknown to the surround. Each of the plurality of Actions may further have two child nodes that are also Actions, and each Action's name may be derived from the names of the Action's child nodes in a manner that prevents the names of the child nodes being derived from the name of the Action. Each of one or more tuples in the tuple space may include one or more security bits that can be set to deny matches of unbound fields to the tuple or to one or more fields of the tuple.

BRIEF DESCRIPTION OF THE DRAWINGS

The invention will be more fully understood by referring to the following Detailed Description of Specific Embodiments in conjunction with the Drawings, of which.

DETAILED DESCRIPTION OF SPECIFIC EMBODIMENTS

Embodiments herein relate to computing systems and computer-implemented methods for specifying distributed computation. The systems and methods utilize computer-readable code causing a computer to engage in reversible, self-organizing hierarchical space-like computation that creates information. The code described herein may be executed from a non-transitory computer readable storage medium for specifying distributed computation. The systems and methods can establish a computational environment, which can be localized on a single computing device but maximizes its potential when distributed over a network of computing devices that may be physically remote from each other but are in electronic communication with each other. Myriad types and compositions of computing devices may be rendered suitable for implementing the inventive systems and methods, provided the computing device has sufficient computing resources (i.e., memory, storage, processor speed, network connection, user interface if needed) to support all or a part of the computational environment, and provided these resources are made available to the computer-readable code and the software and/or hardware modules that contain the code. Some embodiments contemplate implementation of the computations on computer hardware that is under development or only constructively reduced to practice, such as quantum-mechanical, optical or photonic computing devices that can implement the space-like computations from the Fourier/wave perspective described above, rather than the Pythagorean/discrete perspective otherwise described.

TLinda Coordination Language

A space-like computation is easiest to specify using a coordination language. A coordination language is a procedural or control-flow language wholly concerned with coordinating the interaction of concurrently operating processes, herein called threads. Consequently, a coordination language has no facilities for arithmetic calculation; it retains typical control-flow logic, such as conditional constructions (e.g., if-then-else) and loop constructions (e.g., while-do, repeat-until, and (novel) forever-loop; interestingly, forever-loop may be the only typical control-flow logic actually used)—and can include additional control-flow operations to coordinate the threads.

While other suitable coordination languages and coordination models may be used, the present disclosure expresses the coordination language functionality using the language TLinda. TLinda derives from the well-known Linda language, which postulates a global tuple space TS with four operations on a tuple T=[field1, field2, . . . ] that is issued by one of the threads into TS. The four standard Linda operations are Out(T), Rd(T), In(T), and Eval(T):

Out(T) makes T present in TS;

Rd(T) first attempts to match Ts form to the tuples in TS; if T's form matches that of another tuple that is present in TS, Rd(T) will then bind T's variables to the corresponding fields of the match (i.e., Ts variables receive the values of the corresponding fields in the matching tuple) and allow the issuing thread of T to proceed; otherwise, Rd(T) blocks the issuing thread until a tuple matching T shows up in TS;

In(T) is the same as Rd(T), except that it also removes T from TS under mutual exclusion. This assures that one can create a synchronization token when necessary, in that using In(T) prevents copies of T (i.e., the token) from being made accidentally. Otherwise, each thread manages its own tuples, which, once allocated, remain so; an allocated tuple's presence counter (a system field of the tuple which is invisible to users, is incremented by In(tuple) and decremented by Out(tuple), and is never less than zero) indicates its availability (i.e., if the presence counter is greater than zero, the tuple is present in TS);

Eval(T) creates a new, independent thread specified by the tuple T, which indicates a piece of Tlinda code. Eval(T) does not halt the issuing thread nor promise to return a value to the issuing thread (or to any other thread, for that matter).

To these classic Linda operations TLinda adds Co(U, . . . , V), NotCo(U, . . . , V), AntiRd(U, . . . , V), AntiCo(U, . . . , V), and AntiNotCo(U, . . . , V). These operations test for and block on (i.e., force one or more threads to wait for) the co-occurrence or lack thereof, respectively, of the tuples U, . . . , V in TS, according to Table 1 below (note: "ALL" means "All the tuples specified in the operation"). Each of these operations has a "one-shot" predicate version—Cop, NotCop, AntiRdp, AntiCop, and AntiNotCop—that performs the subject operation (if possible, and without blocking threads) and returns a True/False indication thereof.

TABLE 1

Co, NotCo, AntiCo, and AntiNotCo semantics

| In TS? | #Tuples | Event | Operation | Semantics |
|---|---|---|---|---|
| TRUE | ALL | UNTIL | Co U, . . . , V | Block UNTIL ALL tuples simultaneously present |
| TRUE | NONE | UNTIL | AntiCo U, . . . , V | Block UNTIL NO tuples are present |
| FALSE | ALL | UNTIL | NotCo U, . . . , V | Block UNTIL SOME tuples simultaneously NOT present |
| FALSE | NONE | UNTIL | AntiCo U, . . . , V | Block UNTIL ALL tuples are simultaneously NOT present |
| TRUE | ALL | WHEN | AntiNotCo U, . . . , V | Block WHEN ALL tuples are simultaneously present |
| TRUE | NONE | WHEN | Co U, . . . , V | Block WHEN NO tuples are present |
| FALSE | ALL | WHEN | NotCo U, . . . , V | Block WHEN ALL tuples are simultaneously NOT present |
| FALSE | NONE | WHEN | Co U, . . . , V | Block WHEN NO tuples are simultaneously NOT present |

Thus, the overall style of the computation derives from the utterly concurrent associative matching between tuples in a surround that includes TS (the tuples expressing current thread states), combined with the inbuilt synchronization properties (i.e., thread blocking) of the tuple operations themselves.

Space-Like Computation Components

The present systems and methods may use the coordinating principles of TLinda to configure different types of objects that appear in TS specifically or in the surround more generally. Non-limiting examples of such objects, which may be components of a space-like computation, include tuples, co-exclusions, threads, impulses, goals, sensors and meta-sensors, effectors and meta-effectors, Actions, Event Windows, and Corms. These objects are defined as follows (see also attached TLinda code Appendix).

A thread is a "light weight" process—a small sequential computation with minimal own-state. Threads in TLinda are analogous to non-value-returning subroutines in object oriented or other high-level programming, and consist primarily of operations involving Tuple Space. The activity of multiple related threads (e.g., in an Action described below) is coordinated via the blocking properties of the primitives Rd, In, etc. So in a reductionistic sense, the hierarchy is made out of threads.

A sensor is a single threaded TLinda object that senses (or does not sense) a particular phenomenon in the surrounding environment and relays the result to Tuple Space. In some implementations, the sensor may have two states, and thus translates the result of its sensing into a binary signal. The two-state implementation is assumed in the present disclosure. In one example, +1 indicates that whatever the sensor senses is currently present in TS, and −1 means that whatever it senses is currently absent from TS. A zero value of a sensor indicates an error or exception. This $Z_3 = \{0, 1, 2\} = \{0, 1, -1\}$ number system can clearly be generalized to $Z_n$ or even the real numbers R, but this comes at the expense of mathematical tractability; that is, the ability to mathematically prove that a given space-like computation does what is claimed it does is lost. In other implementations, the sensor may have more than two states (e.g., a spinor sensing an electro-magnetic field).

An effector is a TLinda object that a computation invokes to influence its environment. The effector is defined in terms of (1) an output command to cause the effector's effect (e.g., in program code, a function call, with or without passed variables, that invokes operations of a peripheral device), and (2) a sensor that detects the effector's effect on the surround (i.e., an effector sensor); the effector sensor switches its state in response to the effect. More complicated effectors can easily be defined using this template.

In space-like computations, sensors may vastly outnumber effectors, as it is the number of sensors n that determines the amount of information that can be learned, which is of order $O(2^n)$, whereas (in principle) effectors consume information.

An Action is a TLinda object that specifies, controls, and expresses a co-exclusion of at least two other entities (e.g., processes, sensors, or other Actions). Every Action is labeled with its name, its external state, its level, and its grade, and perhaps other categorical information. The external state is a value, which in the two-state embodiment is one of two 'spin' (i.e., scalar) values 1 and −1. An Action's level is based on the number of co-exclusions beneath it in the hierarchy. An Action's grade is an integer representing the number of sensors whose states determine the external state of the action; the grade is one of $\{1, 2, 3\}$ (i.e., a 1-vector a has grade 1, a 2-vector ab has grade 2, etc. A scalar number like 1 or −1 has grade 0), and higher grades than 3 do not exist in the suggested implementation. An Action is grounded when the conditions for the Action to "fire" are currently met in the surround.

The categorical information can identify the Action as the member of a given equivalence class of Actions. Examples of such equivalence classes include "all Actions with grade 2 mod 4", or "all Actions with [level, grade]=[12, 3]". These equivalence classes correspond to various frequency bands according to Parseval's Identity, as explained above. Every such equivalence class can be represented by a single Action whose external state (spin) is determined by some property of its constituents, for example the sum of their spins in $Z_3$ arithmetic. These Actions can then be treated like any other.

An Action has two main parts—a meta-sensor part and a meta-effector part, each having several threads. See Meta-Sensor and MetaEffector threads in the Appendix. Threads of an Action's meta-sensor part may encode into one or more tuples the name, external state, level, grade, etc., of the Action. Other of the meta-sensor part's threads may effectively be called meta-sensors, because they each monitor the state of a sensor, or of a meta-sensor in another Action. The meta-sensors thus represent a sensor list of the Action—that is, a list of all of the sensors monitored by the Action either directly or via one or more meta-sensors of other Actions.

These meta-sensors further propagate information from bottom-level sensors up the hierarchy described below ("bubble-up"), where they are monitored by another meta-sensor of an Action above in the hierarchy; thus, when a child-entity of the Action changes its external state, this change is propagated through the Action to the Action's parent entities. The TLinda code for this is very straightforward (see Appendix).

Similarly, information from higher-level Actions is propagated downward in the hierarchy ("trickle-down") by Meta-Effectors to the bottom-most primitive effector level, where the environment is then directly influenced by the effector(s) involved.

An Event Window (EW) is a TLinda object for efficiently discovering co-exclusions among tuples, which are turned into Actions (think m-vectors, m≥2). The operational principles of EWs are described in U.S. Pat. No. 5,864,785 (time-window based sensor monitoring), incorporated fully herein by reference. Essentially, the EW includes one or more match criteria to which certain m-vectors, such as Actions, match; one or more of these m-vectors are said to be "contained" within the EW. Recognizing that m-vectors can themselves be the subject of an EW's focus provides the self-organizing component of a space-like computation. An EW may be instantiated to have a fixed sampling interval ΔT. Alternatively, an EW may have a minimum sampling interval, a maximum sampling interval, or both. The EW may thus be configured to register events occurring at least as frequently as the minimum time interval and/or no more frequently than the maximum time interval.

A space-like computation is first and foremost hierarchical. The computation's hierarchy is comprised of nodes arranged in discrete levels, at least one of the nodes in each level being connected to a node in the level above (except the top-most level), and at least one of the nodes in each level being connected to a node in the level below. The nodes at the bottom-most level of the hierarchy (level one) are occupied by the sensors (threads) sensing the surround, expressed mathematically as 1-vectors. The remaining levels of the hierarchy are formed by Actions that are discovered and instantiated via the Event Window mechanism (see Corms). Thus, all succeeding levels (level two and up) represent m-vectors, m>1, insomuch as their constituent Actions are combinations of 1-vectors. For clarity, an Action's level is its level in the hierarchy; however, the level of the hierarchy does not necessarily correspond to m, nor to the number of 1-vectors represented by the Actions on the level. Thus, for example, Actions of level 2 may be combinations of two or three 1-vectors. A new Action formed from two constituent Actions moves up one level from its constituent Actions; the new Action's node is a parent node to the child nodes, ie. the constituent Actions.

A Corm is a TLinda object that instantiates the EWs of the computation, which thereafter take over the growth of the computation by discovering co-exclusions as explained above and returning the co-exclusions to the Corm. The receiving Corm creates (i.e., instantiates) a new Action from the properties of the entities in the co-exclusion. A Corm may be tied to a single level or multiple levels of the hierarchy, instantiating the Actions thereon. A simple Corm may instantiate just one EW, for example to generate all of the Actions of its level. A more complex Corm may instantiate multiple EWs, including devoted EWs that match specific Actions or tuples as described below. A Corm can be configured to instantiate new Corms, and can as well re-instantiate itself, all to facilitate building the hierarchy of Actions. In particular, when a new Action's formation implies a new level is to be created, the Corm of the current level may create a new Corm for this new level. The Corm may further be responsible for calculating the grade of the new Action, advantageously using Clifford-optimized calculations as described below with respect to Table 2.

Actions exist to carry out goals, which when successfully carried out, end with the successful operation of one or more effectors, which propagate the goal's intent into the surrounding environment. Goals arise from impulses, which originate (for present purposes) in the surround and comprise the phenomena in the surround that the sensors can be configured to sense. An impulse is a tuple introduced into the space-like computation at some level of the hierarchy, which—due the hierarchy's self-similarity—we can denote as "the bottom" level for present purposes. This "introduction" requests the simple inversion in the value of a sensor X from its current state to its opposite state. The sensor X that is configured to receive the impulse—i.e., the sensor X senses the presence of the impulse-tuple—is the receiving sensor. For notations that indicate impulses and goals, either the algebraic measurement form ($\pm 1+X$), $|X|=1$, or the TLinda tuple encodings [↑, X, NotX] for an impulse and [!, X, NotX] for a goal, may be used; in either case, X may be a sensor or a meta-sensor.

As described further below, the inversion of the receiving sensor's state changes the external states of the Actions that have the receiving sensor in their sensor list. The Actions that directly monitor the receiving sensor (i.e., contain the sensor and are at the lowest level of the hierarchy above the receiving sensor) are the first Actions to detect the inversion of the state of the receiving sensor and are responsible for initiating the propagation of the sensor's state change to an Action that is grounded. These first-receiving Actions are referred to herein as originating actions.

Primitive Functionalities

Unlike virtually all time-like computations, a space-like computation does little or no arithmetic. Nevertheless, although not part of the main thrust, it is inevitable that some arithmetic must be performed. TLinda can be expanded to include it, and/or it can be simulated by a space-like computation. For example, a space-like computation can map the binary number 10011 into the "binary" hierarchy+abcde−abcd−abc+ab+a via the mappings 1→+ and 0→−. Another possibility is to define special-purpose Actions that respond to requests for arithmetic calculations of various kinds.

It is possible to record co-exclusions and Actions as they occur, which record can serve as a means to restore or clone a given space-like computation. However, keeping in mind the No-Copy theorem of quantum mechanics, the restored or cloned computation must necessarily differ from the original because the particular internal state at the time the latest item was recorded must also be preserved. This "dump" computation must therefore take place outside of the space-like computation that is being copied. Thus, the save procedure consists of two steps: record continually, and when desired, dump, such as to memory or storage of the computing device. The restore operation then uses this dump to re-establish the structure and state of the interrupted computation.

Optimizing Event Windows with Corms

The inventor's previous work demonstrated that, in principle, any tuples in TS may be co-excluded to form Actions, which is what Event Windows effectively do (namely δ, discovering the co-exclusion and passing it back to the Corm for instantiation of a new Action). With efficient hardware and software implementation of large systems in mind, the following innovations optimize this generality in order to determine which tuples it is best to focus on.

A simple but crucial optimization, which may be performed by TLinda's Opposite operation, specifies that the two opposite spin values of a newly formed Action's external state are not themselves to be co-excluded, as this would be redundant (though perhaps thinkable in some research context). Further, when instantiating an Action (i.e., implementing δ), ensure that the actions of the Action's child nodes B1, B2 do not share any sensor $s_x$. That is, require that B1 ∩B2=0. This is efficiently accomplished by recording each constituent sensor $s_i$ of the Action in a sensor list associated with the Action at the time of instantiation. Thus, at any level, the Action's sensor list contains the names of all of the sensors that actually constitute that Action. Sensors, being the bottom level, have no child nodes. The actions of child nodes B1, B2 will possess sensor lists, and their intersection is thus easily computed. If B1∩B2≠0, then no Action is instantiated. (This is not an error, just a semantically disallowed combination, because it misstates the effective level and grade of the Action.)

When instantiating an Action, also emit a tuple that indicates that the Action occupies a top node, i.e., has no parent. Complementarily, remove any tuples that mark the Action's child nodes as being top nodes.

Also when instantiating an Action, the creation of the hierarchy by interconnecting existing nodes with the node of the new Action may be accelerated by toggling the external state of the new Action back and forth between its two spin values a plurality of times. The toggling may cause the new Action to register in other Event Windows (besides the creating Event Window) having match criteria that match the new Action. Correspondingly, a cascade of Event Window hits may rise through the hierarchy so that the hierarchy completes more rapidly than it would if the environment supplies the same matches.

An Action of grade n can express $2^{n-1}$ distinct co-exclusions. This means that there can, in principle, come to exist $2^{n-1}$ allocated and executing instances of the given Action. These instances must then further engage in a mutual-exclusion protocol to ensure that only one of them is in play in a given context. The first of these outcomes is wasteful and the second complex. In another optimization that avoids both of these outcomes, the Action may be configured to specify/control all $2^{n-1}$ alternatives in one thread, which thread's very sequentiality has the pleasant side-effect of automatically yielding the desired mutual exclusion. The system may instantiate all $2^{n-1}$ instances on the first Event Window hit, or only when an Event Window hit specifically prompts, depending on the embodiment.

In another optimization that ensures both stable operation and tractable mathematical semantics (thus allowing formal proof-of-function), a Corm can modulate the grade of a new Action, which is fundamentally the sum of the grades of the Actions being co-excluded. In Corm-based embodiments, the new grade may be modulated down into the set {0, 1, 2, 3} described above, wherein Event Windows may be employed to detect and return co-exclusions as follows (notation: EW(p, q), where p, q>0, specify two vectorial grades whose corresponding Actions' names and spins are to be noted in the Event Window's match criteria, and which thus can come to be co-excluded to form a new Action):

EW (1, 1), which co-excludes entities with grade 1 mod 4, creating an Action with grade 1+1=2 mod 4. For example, δ(a, b)→ab, =grade 2.

EW (1, 2), which co-excludes entities with grades 1 mod 4 and 2 mod 4, for example δ(a+bc)→abc, =grade 3.

EW (2, 2), which co-excludes entities with grade 2 mod 4, for example δ(ab+cd)→abcd, =grade 4. The sign/orientation of abcd is then mapped to a (conceptually new) 1-vector, i.e., grade 1. This 1-vector represents abcd.

EW (2, 3), which co-excludes entities with grades 2 mod 4 and 3 mod 4, for example δ(ab+cde)→abcde, =grade 5. The sign/orientation of abcde is then mapped to a (conceptually new) 1-vector, i.e., grade 5 mod 4=1. This 1-vector represents abcde.

EW (3, 3), which co-excludes entities with grade 3 mod 4, whence, similarly, δ(abc+def)→abcdef=grade 6 mod 4=grade 2, and abcdef is similarly replaced by a representative 2-vector.

EW (1, 3) is disallowed because it creates systems whose behavior is inherently chaotic and mathematically intractable. Other unlisted grade combinations are claimed but similarly disallowed.

These functionalities may all be implemented in the same module (the Corm), and activated when the module's Event Window discovers a new co-exclusion. Table 2 summarizes the co-exclusions for action level pairs:

TABLE 2

Co-exclusion of Action-pairs and grade of resulting Action

| pairs | δ (pair) | new grade | new grade mod 4 | |
|---|---|---|---|---|
| 3 mod 4 \| 3 mod 4 | → | 6 | 3 + 3 = 6 mod 4 = 2 | ↘ |
| 2 mod 4 \| 3 mod 4 | → | 5 | 2 + 3 = 5 mod 4 = 1 | ↘ |
| 2 mod 4 \| 2 mod 4 | → | 4 | 2 + 2 = 4 mod 4 = 0, add 1 | ↘ |
| 1 mod 4 \| 2 mod 4 | → | 3 | 1 + 2 = 3 "charge" | ↓ |
| 1 mod 4 \| 1 mod 4 | → | 2 | 1 + 1 = 2 "spin" | $\overset{6}{\underset{4,5}{\leftarrow}}$ -1 |
| 0 mod 4 \| 1 mod 4 | → | 1 | "existence" | ← |

In this implementation, the highest calculable grade is six and the lowest is one but these results are modulated into the set {1, 2, 3}; this mod 4 translation of new grades allows for the recursive instantiation of a Corm-controlled 'macroscopic' growth pattern—eg. successive forks on a tree limb—that still retains, in manageable form, the full power of the underlying algebra.

The top-most "level" of the Action hierarchy is a dynamically changing set of Actions, namely those that (so far) are at the top nodes, which have no "parent" nodes. When two of these Actions are co-excluded with each other, their nodes become child nodes of the new node of the resulting Action, which node is now a top node, i.e., a parent with no parent.

In another optimization, the system may devote one or more Event Windows to attend to one or more of the top-most Actions (i.e., Actions at the top nodes). These Event Windows can provide a user or an administrator of the system with a high-level view of the computation's growth and evolution, and as well provide an opportunity to steer these.

Thus, new Actions are added by Corms via Event Windows. An Action may also be deleted, whereupon all upward (parent) Actions that depend on it are deleted (i.e., a second Action at a parent node of the deleted Action's node, and a third Action at a parent node of the second Action's node, and so on, recursively up the hierarchy until the top nodes are reached). The thread deleting the Action may emit one or more tuples identifying one or more of the Actions at the child nodes of any of the deleted Actions as now inhabiting a top node, if such Actions have no parent Actions as a result of the deletion. Deleting a sensor implies deleting any Actions that incorporate it.

To merge two space-like computations P, Q, the system may effectively combine P's sensor/meta-sensor list with Q's, and vice versa, according to need.

Goal-Fulfillment on the Fly

The above description of its components (i.e., sensors, effectors, and actions) shows that the space-like computation, upon the receipt of an impulse "change x to x'," assembles a set of changes to the environment, these changes to be carried out in an order that achieves the desired effect. An example is resetting the state of a satellite, which has many sensors and many effectors. Finding this set of changes and carrying them out in the proper order is not so easily done!

Suppose for example that there are five different Actions that can be carried out. Then each step in the final plan must be, or have been, assembled from these five different possibilities. This means that the number of possible plans of n steps is $5^n$, an exponential growth. Worse yet, in any realistic system—like a satellite—"five" is far too small. 50 effectors and n=500 steps are more likely, yielding $50^{500}$ possibilities! Obviously, searching for a workable plan in a space this size is a formidable task. The following optimizations provide a novel and very efficient solution to this problem.

The first optimization is to assemble plans on-the-fly rather than trying to work it all out ahead of time: given that the environment will constantly surprise, the latter approach is unworkable (cf. Stanford AI's Shakey). Current practice—called subsumption architecture—specifies only very simple plans for very simple situations, which are stored by the system and deployed automatically. Anything more complicated is to be handled "upstairs" by higher level actions, which can piece together the simple plans to solve more complex problems. This very successful subsumption architecture emphasizes simple fail-proof bottom-level actions (e.g., "seek light/darkness", "follow the wall", etc.). Anything beyond these simple actions is the job of higher-level modules, which are designed and assembled, perhaps on the same philosophy, and most often by a human programmer. A space-like computation's self-organizing ability replaces all such specification and human input, and thus automates the structuring and assembly of arbitrarily complicated subsumption architectures.

The second optimization is to fight the exponential explosion of possibilities with the logarithmic reduction offered by hierarchy. A hierarchy of Actions—a first level of Actions sitting directly above the system's effectors, a second level of Actions sitting above and including the Actions of the first level, etc.—all deduced from the environment's observed behavior, is key. The Event Window mechanism builds exactly such hierarchies, but that basic mechanism is unselective and therefore does not scale well to large systems. The optimizations on the use of Event Windows by Corms remedy this problem.

The third optimization is a specific way to use the Action hierarchy to create complex many-leveled plans on-the-fly. A plan is expressed in terms of one or more goal states of the space-like computation S that S tries to achieve by carrying out the various actions that it is capable of. Usually, the goal state is a set of sensor states, but it could also be some more abstract state that corresponds to some higher-level consideration.

There are two phases of carrying out actions to achieve the goal state: the bubble up of impulses (i.e., state changes of receiving sensors) and other sensor information from S's boundary to the upper levels of the hierarchy; and the subsequent trickle down of the resulting goals (i.e., converted impulses) from upper-level Actions. Both of these concurrent flows are the responsibility of Actions, and all Actions behave identically in this respect. Thus, the various threads constituting an Action are grouped into three main sets:

A first set of threads is responsible for peering downward in the hierarchy for what might have changed, and when a such a change occurs, updating the Action's external state accordingly and bubble this change further upward to its parent Actions. This has two aspects: bubbling impulses up (which triggers back-chaining, described below); and bubbling other sensor information up.

A second set of threads is responsible for back-chaining, as described below.

A third set of threads is responsible for peering upward in the hierarchy looking for downward trickling goals with this Action's name. This again has two aspects, if the Action is grounded: when such a goal appears, split it into goals (i.e., subgoals) on the Action's child nodes; and instigate "firing" forward on any chain(s) linked to the Action.

The TLinda code for all of these threads appears in the Appendix document, which code only specifies minimal functionality, a "suggested implementation."

Example Problem

An example problem can further explicate the described computing environment. Consider a surround referred to as Block World, with the following sensors (also see the TLinda code in the Appendix):

TABLE 3

Sensors, states, and notation for example Block World problem.

| Sensor | Hand | Hand@ | Hand@ | Hand@ | Place A | Place B | Place C |
|---|---|---|---|---|---|---|---|
| States | Full/Empty | a/not | b/not | c/not | Full/Empty | Full/Empty | Full/Empty |
| Notation | h/h' | @a/@'a | @b/@'b | @c/@'c | a/a' | b/b' | c/c' | and with the primitive effectors:
Hand Grasp/Release:

grasp:$h' \to h$+Place $X \to$Place'$X$;

release:$h \to h'$+Place'$X \to$Place $X$.

Hand Move1 Left/Right (x, y change, z doesn't):

$-@x \to @'x$ $-@'y \to @y$ $-@z \to @z$.

Previous to this, the computation has deduced the following Actions ("|" means xor, with precedence less than +):
Hand at Place X and not at Place Y:

$$@x + @'y \mid @'x + @y \overset{\delta}{\Longrightarrow} @x + @'y \leftrightarrow @'x + @y$$

Grasp/Release ON a, b, c:

$$a + h' \mid a' + h \overset{\delta}{\Longrightarrow} ah' \leftrightarrow a'h$$

$$b + h' \mid b' + h \overset{\delta}{\Longrightarrow} bh' \leftrightarrow b'h$$

$$c + h' \mid c' + h \overset{\delta}{\Longrightarrow} ch' \leftrightarrow c'h$$

Grasp/Release AT Place A, B, C:

$$@a: ah' + @'a \mid a'h + @a \overset{\delta}{\Longrightarrow} ah' @'a \leftrightarrow a'h@a$$

$$@b: bh' + @'b \mid b'h + @b \overset{\delta}{\Longrightarrow} bh' @'b \leftrightarrow b'h@b$$

$$@c: ch' + @'c \mid c'h + @c \overset{\delta}{\Longrightarrow} ch' @'c \leftrightarrow c'h@c$$

Block at x and not at y:

$$x + y' \mid x' + y \overset{\delta}{\Longrightarrow} xy' \leftrightarrow x'y. \text{ E.g., } ab' \leftrightarrow a'b.$$

In the bubble-up phase, changes to, e.g., x are picked up by its co-exclusions xy, xz and sent further up the hierarchy. This applies both to sensors and meta-sensors.

The example problem—to both motivate and illustrate the goal generation algorithm—is a goal to move a Block from Place A to Place C. That is, the impulse to fill Place C, [↑c', c], is issued into the surround. Let us assume that in addition to the above actions, the space-like computation S has learned the actions ab'↔ a'b and bc'↔ b'c, but not yet the action ac'↔ a'c, so to accomplish [!, c', c] it must first move the block from a to b, and thence from b to c.

Thus if the impulse is simply echoed by the corresponding goal, which will be a goal on c, namely [!, c', c], there is no explicit connection between c back to a (where the block currently is), and therefore no basis for issuing a subgoal to empty a (nor the latter's natural subsequents). Thus although all the necessary machinery is present, the goal cannot be fulfilled. The present algorithm solves this problem, which is of a very general nature, and does so very efficiently.

Impulse and Goal Propagation

Propagating the initial impulse and translating it into various goals requires establishing the missing connection(s) between the current state and the goal state.

Figure 1:
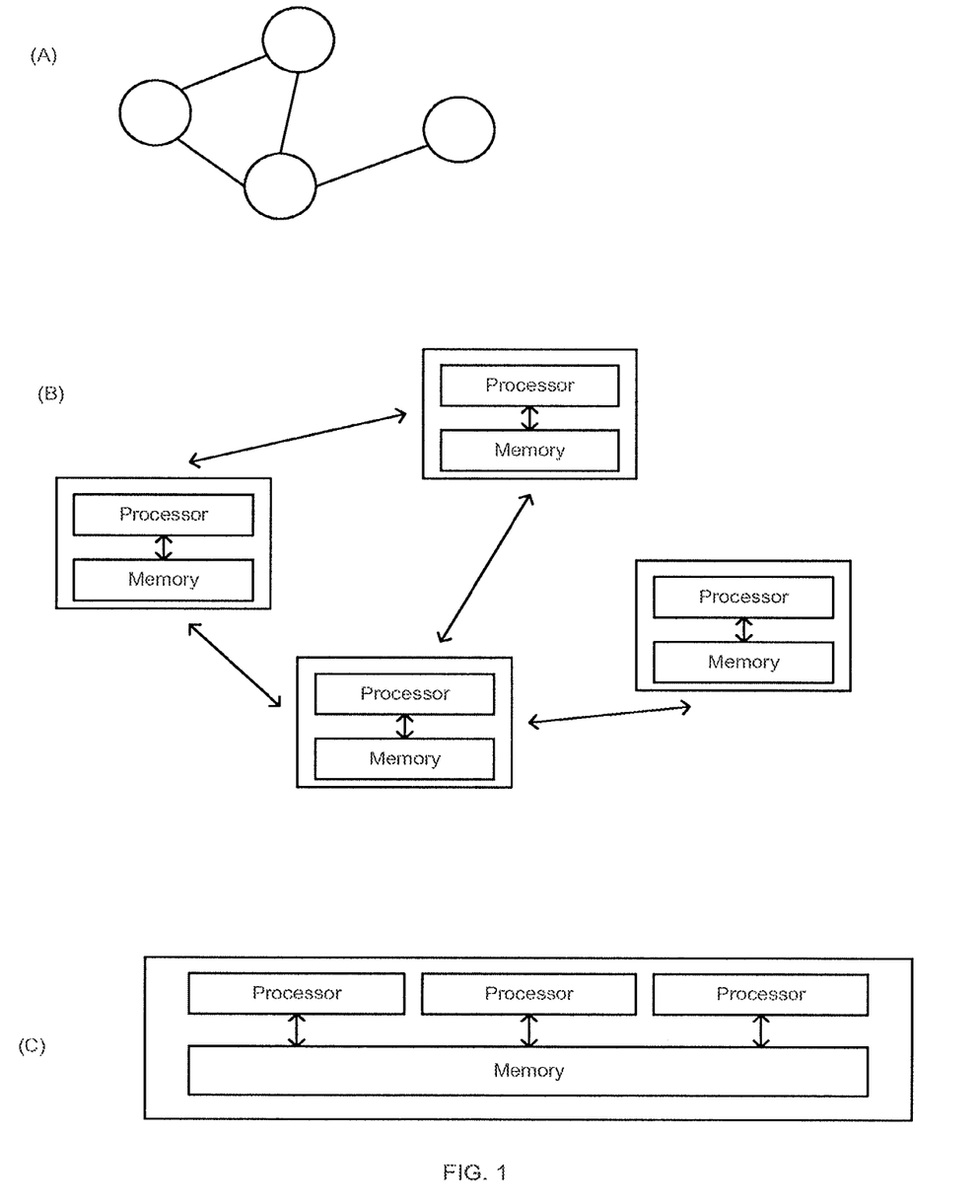
FIG. 1 is a schematic diagram showing the basic components and example arrangements for distributed computing systems (a) and (b) versus parallel systems (c)
Figure 2:
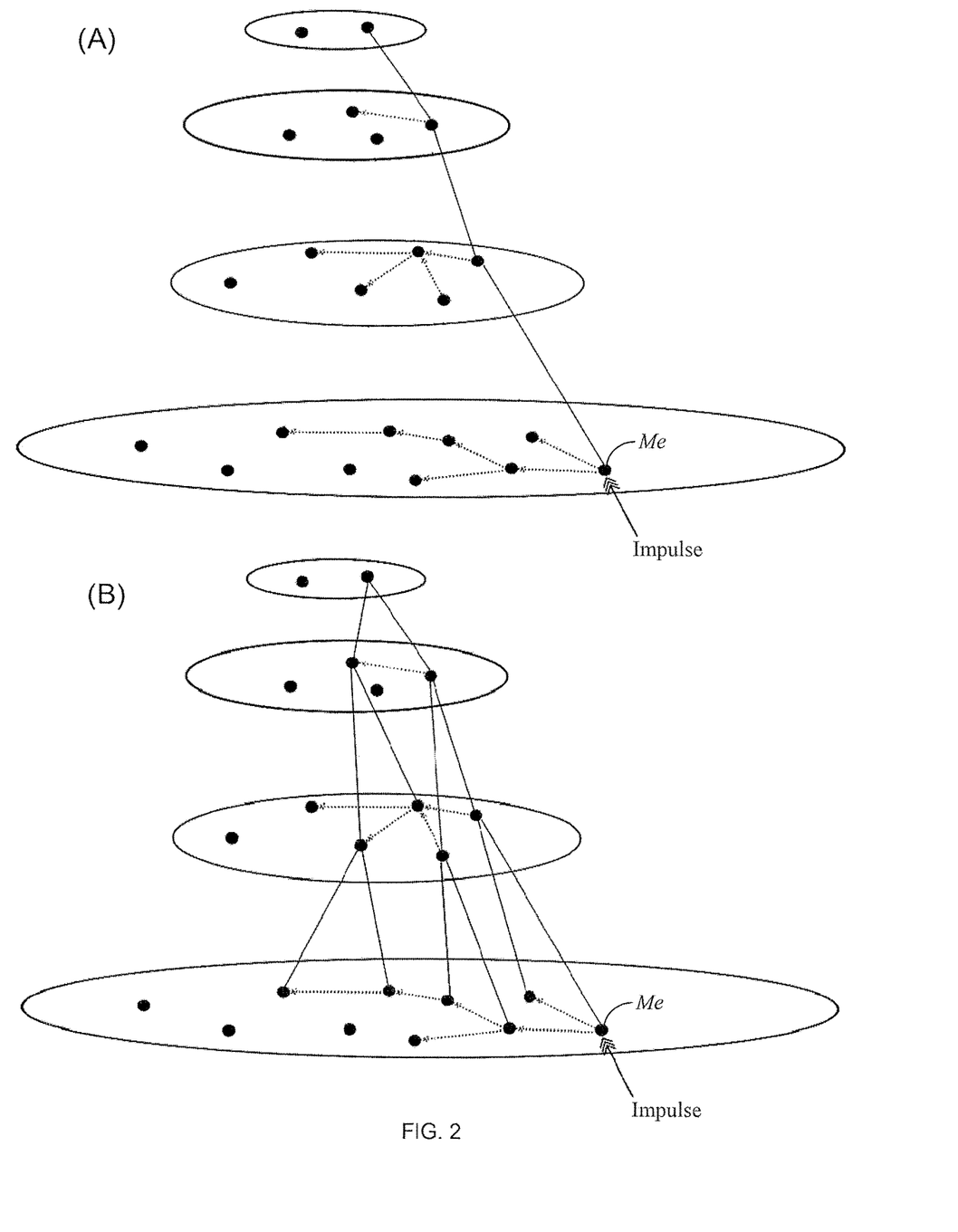
FIG. 2 is a schematic diagram showing bubbling-up and back-chaining of an impulse (A) and trickling down of a goal (B) through a hierarchy of Actions.

This has both a horizontal and a vertical aspect, illustrated by example in FIG. 2. The vertical aspect is the propagation of environmental impulses for change, [↑, X, X'], upwards in the hierarchy, which bubbling up is a crucial aspect of space-like computation's efficiency, since this reduces the search space logarithmically. These up-bubbling impulses are ultimately translated into goals that "tree out" as they trickle down and retrace the trail of the impulses as they bubbled up. In so doing, they intersect the horizontal aspect, as follows.

The horizontal aspect of impulse propagation is a distributed version of back-chaining. Instead of thinking current-state-to-goal-state, the algorithm approaches the progression from the goal-state backwards to the current-state, and then uses these (causal) paths that connect the two. In either direction, of course, the possibilities tree out exponentially, so it is critical to keep this explosion from impacting efficiency. The algorithm accomplishes this using the intersection of the vertical and horizontal aspects.

Every level of the Action-hierarchy corresponds to such a "horizontal" plane. Furthermore, as one ascends upwards in the hierarchy, a level's Actions' effective grade increases (~doubles) at each step, and the computation's reasoning becomes correspondingly and increasingly global in scope and consideration.

When an Action Me=XY notices an impulse [↑, X, X'], where X is one of Me's two constituent child nodes, and Me is not grounded, it issues an impulse [↑, Y, Y'] that asks, essentially, "Is there any Action (on this level, represented in FIG. 2 by the ovals around several Action-nodes) that flips (X's partner) Y as part of its co-exclusion?" If such an Action is found, Me can flip X by itself. The impulse emitted by Me is a back-linking impulse. Every Action has a thread that looks for these back-linking impulses, and finding one, adds itself to the chain in the same way: this is the back-chaining (represented in FIG. 2 as a dotted arrow from the emitting node to the receiving node). This continues (in concurrent distributed fashion) until the chain reaches Actions that are grounded, which means that the Action in question could (if allowed) initiate the chain of effector activations that would eventually reach the instigating Action Me, because the current state of the environment matches the state required to (probably) succeed. The algorithm, being a coordination algorithm, avoids creating unnecessary copies of things, e.g., in the case of overlapping or out-dated chains, by storing such state information as thread state (together with the surround) rather than memory state, as is typical of conventional computations. The algorithm may further impose a maximum length of chains, which limits the possible current states that could change in reaching the goal state.

There can be many chains of links connecting actions on each level—all possible routes from B to A (three such chains in the first level and three in the second level of the hierarchy of FIG. 2)—forming a tree of causal links back to the originating action. The back-chaining process therefore does not allow chains to begin execution, because there can be many such chains—all possible routes from B to A—which if all executed at once would create much wasted effort or worse. Rather, the backward chains—in every level on the way up—are kept in abeyance until grounded higher- or top-level nodes issue the required goal(s). These goals then trickle down, treeing out, and any grounded Actions that they meet (i.e., grounded with respect to a subgoal that has a causally prior subgoal just completed via the trickling-down) are only then allowed to activate their childrens' meta-effectors. The hierarchical stacking of the chains ensures that sub-goals are emitted in the proper order (and if not, then learning will eventually remedy this).

An impulse or back-linking chain that has reached the Action Me, when Me is not grounded, results in both the further backward propagation of the chain and the bubbling up of the impulse (shown by the solid lines in diagram (A) of FIG. 2), this latter in the form of a new impulse on Me itself: MeImpulse=['^', XY, -XY]. This in turn triggers back-chaining on the next level. When a top node is reached, the impulse is converted into the requested goal and sent back down the hierarchy (shown by the solid lines in diagram (B) of FIG. 2). This conversion may, likely in many cases, be expanded into some more nuanced decision, probably including humans.

Note the Action-pairs that arise as a back-chain is transited forwards. The tuple ["D;", AtoB] indicates that the two Actions A, B as child nodes of the same parent node are to be executed in strict order: first A then B. In some embodiments, a counter may be incremented each time this pair is used, and pairs with higher counter values may be prioritized in alternative plans. This will eventually create long chains of "good" plans, and hierarchies thereof. Unfortunately, this solves a non-existent problem, as any given pair will always be chosen in the same situation anyway, and the choice algorithm is very efficient. So nothing is gained. Furthermore, the flexibility provided by the space-like hierarchy—which gathers all the relevant aspects of a situation—is usurped by a myopic, less flexible, and possibly out-dated time-like solution.

There can, in principle, also be impulses, goals, actions, etc. for Relevance (i.e., for forcing an Action to become grounded) and even for goals. However, such generalizations are mathematically fraught.

The nodes of geographically distant Actions, and their Child and Parent nodes, may be connected by a subscription mechanism that automatically propagates given state changes between such nodes, whether these be sensors, impulses, goals, effectors, or control tuples. In some embodiments, a subscription may be maintained by adding together the sensor lists of the Actions at the nodes to be connected. Such addition will propagate, to a first of the connected nodes, changes in sensors at nodes below the second connected node. Further, the subscription can include Actions at nodes above the connected nodes. In some embodiments, the subscription mechanism may be a system functionality, such as a function call, and may be initiated by a user or administrator that identifies the nodes to be connected via subscription.

Although the concept of "recalling something from memory" per se is an implicit part of the operation of a space-like computation, the system can execute a recall operation to retrieve a particular computation or fact F (i.e., a particular state of Actions or sensors) known to S. In one embodiment, the system creates a devoted Event Window having match criteria that match the fact. The devoted Event Window thus "contains" the fact. The devoted Event Window may further contain one or more additional Actions, such as Actions at the child nodes of the fact's node. In other embodiments, rather than itself matching the devoted Event Window, the fact may be an impulse that bubbles up to the Actions contained in the devoted Event Window. To recall the fact from the devoted Event Window, an impulse for the fact F is issued. The consequent up-bubbling F-associated impulses will then be found in the devoted Event Window's buffer.

The above-described recall operation may be extended to discover novel processes, which are, essentially, chains of actions that trigger effectors to achieve a goal that S did not previously know how to achieve. Using the contents of an Event Window that is devoted to a recall operation, a space-like computation can emit subgoals, to be carried out simultaneously, which stimulate (i.e., ground) one or more of the Actions involved in the recall operation. Thus, the novel process is or can be defined in terms of existing Actions and/or new Actions formed by co-exclusion of existing and/or stimulated Actions, and the lacking concepts/ nodes will be knitted together. One can also pursue this problem from the Fourier side, by having as a goal the generation of a particular resonance that corresponds to the fact(s) being recalled. The system may be configured, such as with function calls or other program code, to initiate the discovery of novel processes in this manner while system resource usage is low, such as during periods of low activity in the computation or when there is a goal that cannot be satisfied (i.e., none of the top-level actions receiving a bubbled-up impulse is grounded).

Security in Computations

Because a space-like computation S derives from, and is reactive with, its environment, an external process can only approach S on S's own terms. Otherwise, the space-like computation will not react at all. This is the basis for securing the integrity of a space-like computation relative to its environment.

Relative to a space-like computation's interior, individual communications (namely individual tuples in TS) can when necessary be encrypted. Encrypted or not, such communications are so microscopic in their scope and atomic in their content—typically just a ±1 value and an anonymous tag— as to be of little value anyway. It is only in the dynamic event structure erected and maintained by the space-like computation that actual meaning lies.

The basic principle is that information about S may only be obtained via interaction. Consider S in a surround that comprises an interrogating process P?. S creates (internal) information through its interaction with P?. This information bubbles-up inside S before trickling-down in the form of a reaction (in the shared environment) that it is up to P? to perceive. Such latter perceptions are necessarily P?'s only source of information about S. P? will therefore never get more information from S than S gets from P?. Only if P? is a space-like computation like S can the information exchange be equal.

In particular, the names of the Actions (whose hierarchical arrangement constitutes S) are unknown to P?, since only behavior ("motion") of S is externally visible. Lacking these names, P? cannot hope to penetrate S. To ensure, additionally, that Actions remain anonymous relative to each other within S, an Action's name NA is created from its child nodes B1 and B2 as NA=f(B1, B2) where f is a so-called trap-door function that loses information, whence B1 and B2 cannot be derived from NA. Preferably, f=xor, a common and efficient hardware operation. Choosing f to be an encryption is possible, but it is by nature reversible and would constitute a security weakness.

In this way, only the Action itself knows its child nodes, and even no other Action can, because the names B1 and B2 are only known within the Action, and the names B1 and B2 were themselves earlier created in the same way. This is true of all Actions. Indeed, with little overhead, the Bi can be assigned new names every time they are co-excluded. Giving the sensors constituting S's boundary with its surround random names then ensures, topologically, a basically inscrutable defensive perimeter. Such code-naming strategies combined with the formal power of the underlying (Clifford) algebraic semantics (eg. to prove correctness) endows space-like computations with uncommonly strong and fundamental architectural support for building stable and secure systems.

This is especially comforting when one recalls that space-like computations are self-organizing, whence all this security occurs automatically, not least because all Actions obey the same interaction protocols. An Action that doesn't obey these will have a very hard time interacting with any other Actions, because it doesn't know any of their names.

The Actions of the child nodes B1, B2 may be further protected by encrypting the sensor lists of these Actions, so the addresses of the sensors are not publicly available.

As a further measure against rogue TLinda code, each tuple may be equipped with one or more security bits that deny matches of the tuple to unbound fields. That is, the standard minimal Linda tuple match (namely on typed fields) is extended such that "wild card" matches are not allowed on designated fields and/or tuples. This simple measure short-circuits "fishing expeditions."

P? causes S to react by issuing an impulse [↑, s→s'] that requests that S change the state of (environmentally shared) s to s'. This impulse bubbles-up until it meets one or more Actions that can satisfy it (i.e., the Action has parameters that match the impulse's parameters; such an Action is not necessarily grounded), which results in the issuing of a corresponding goal by each such Action. Each goal trickles-down, ultimately resulting in the effector goal [!, s→s']. The transition s→s' is the only thing that P? sees. Exceptionally, S may advertise a higher-level Action (i.e., NA vs. the sensory boundary {s}) as available to external impulse. However, since Action NA is the goal-fulfiller, the impulse does not propagate further up the hierarchy, thus implicitly limiting P?'s access to S's interior to what S allows, and no more.

When an Action is grounded, this means that it can potentially be carried out; but, only potentially. The groundedness (i.e., Relevance) of an Action indicates that some arrangement of Actions in the hierarchy below the grounded Action is synchronized to carry out the Action. Despite this useful piece of information available to, e.g., a human administrator viewing the grounded Action, the mere fact that it is grounded gives no indication of exactly how the Action will be carried out, nor where or when. This inherent lack of detail can be used to enforce privacy of local information while still allowing lawful authority the ability to monitor possible outcomes at a broad higher level. That is, a lawful monitor can see that the lower-level actions are coordinated in an acceptable configuration; otherwise, the Action would not be grounded. The monitor cannot see the details of the lower-level Actions, however, so those remain locally private. Since the Actions are arranged in a connected hierarchy, with the proper permissions (i.e., a search warrant in a criminal situation) the monitor could descend through the nodes down to a level where an Action is behaving inappropriately.

Other Features

An avatar is a software structure that represents a (usually human) entity to the remainder of a computer system. Most commonly, people employ avatars to represent them in video and online games, but the concept is very general, both for the user (who has great flexibility in choosing their representation) and the system designer (who can design a safe, robust, general purpose and generic avatar interface that is used by all). In some embodiments, such an avatar structure may be realized in a space-like computation via a suite of system-supplied Actions whose sensors and effectors are the virtual world to which it is interfacing, and whose motivations are rooted in a space-like computation that is being inhabited by the user (who is passing impulses up to its avatar suite, and awaiting their fulfillment). In other embodiments, the sensors and effectors may themselves be the avatar's interface to the virtual world. That is, the space-like computation, via its sensors and effectors, effectively instantiates the avatar in the virtual world, which has its own sensors and effectors. Users may define sub-avatars of the generic avatar, and decorate these freely. Avatars can, whole or in part, be driven by software, but must always be anchored to a human individual's public identity, so there is someone to whom responsibility for its actions can be assigned.

Goal-driven processes can deadlock or livelock, both which lock a set of processes in a permanent closed cyclic pact. Via Parseval's Identity, one can view the operation of a space-like computation in the wave (i.e., Fourier) domain. "Dead-spots", "lines" or some other characteristic pattern in the spectrum of the computation will then indicate the presence of a deadlock or livelock, and as well identify the Actions participating in the lock. The lock can be broken by temporarily removing (or otherwise silencing) the goals or impulses involved, and then reestablishing the removed goals or impulses (e.g., according to established principles of contemporary operating system design) after a fitting period of time. Since most such locks are "unlucky", they will likely not re-appear after such an interruption.

The mental mechanism that focuses on the most current events is called short term memory (STM), and is subsumed by, and thus generalized by, the Event Window mechanism, which can operate over any suitable period of time, including STM-domain time periods.

What is claimed is:

1. A computing device configured to implement a space-like computation using a plurality of concurrent threads that are each activated based on the occurrence, co-occurrence, or exclusion of states belonging to other of the concurrent threads, the computing device comprising:
   a plurality of two-state sensors that each sense a phenomenon within a surround that includes a tuple space, and each produce a binary signal indicating whether the sensed phenomenon is present in or absent from the tuple space;
   one or more effectors configured to produce an effect on the surround, wherein for each effector at least one of the plurality of sensors senses the effect of the effector on the surround;
   a plurality of actions each having an external state, a level, and a grade, and being configured to execute a co-exclusion of two of the concurrent threads,
      the external state being determined at least in part by the states of one or more of the sensors,
      the level representing the number of the co-exclusions beneath the action in the hierarchy, and
      the grade representing the number of sensors whose states determine the external state of the action,
      the plurality of actions being arranged in a hierarchy wherein each of the plurality of actions is a node in the hierarchy; and
   one or more Corms each configured to instantiate a new action in the plurality of actions by:
      instantiating, on one or more levels of the hierarchy, at least one event window configured to detect a co-exclusion between two of the plurality of actions and return the co-exclusion to the Corm that instantiated the event window;
      responsive to receiving, from one of the at least one event window, the co-exclusion of a first action and a second action of the plurality of actions, connecting the nodes of the first action and the second action as child nodes of the new Action node;
      setting the external state of the new Action according to the external states of the first and second Actions; and
      setting the grade of the new Action based on the grades of the first Action and the second Action;
   each of the one or more Corms being further configured to instantiate the new Action only if the first action does not share any of the plurality of sensors with the second Action.

2. The computing device of claim 1, wherein the Corm that instantiates the new Action:
   emits a tuple indicating the new action is one of one or more top nodes of the hierarchy, the one or more top nodes being nodes that are not child nodes of any other of the nodes; and
   removes any tuples that indicate either of the child nodes of the new action is one of the top nodes.

3. The computing device of claim 1, wherein the Corm that instantiates the new Action sets the grade of the new Action based on the grades of the first Action and the second Action as follows:
   the Corm instantiates the new Action with grade 1 when the first Action has grade 0 and the second Action has grade 1;
   the Corm instantiates the new Action with grade 2 when the first Action has grade 1 and the second Action has grade 1;
   the Corm instantiates the new Action with grade 3 when the first Action has grade 1 and the second Action has grade 2;
   the Corm instantiates the new Action with grade 1 when the first Action has grade 2 and the second Action has grade 2;
   the Corm instantiates the new Action with grade 1 when the first Action has grade 2 and the second Action has grade 3; and
   the Corm instantiates the new Action with grade 2 when the first Action has grade 3 and the second Action has grade 3; and
   wherein any other combination of the grades of the first Action and the second Action results in the new Action not being instantiated.

4. The computing device of claim 1, wherein each of the plurality of Actions further comprises:
   a name that is known to the space-like computation and unknown to the surround; and
   two child nodes that are also Actions, and wherein each Action's name is derived from the names of the Action's child nodes in a manner that prevents the names of the child nodes being derived from the name of the Action.

5. The computing device of claim 1, wherein each of one or more tuples in the tuple space includes one or more security bits that can be set to deny matches of unbound fields to the tuple or to one or more fields of the tuple.

6. A computing device configured to implement a space-like computation using a plurality of concurrent threads that are each activated based on the occurrence, co-occurrence, or exclusion of states belonging to other of the concurrent threads, the computing device comprising:
   a plurality of two-state sensors that each sense a phenomenon within a surround that includes a tuple space, and each produce a binary signal indicating whether the sensed phenomenon is present in or absent from the tuple space;

one or more effectors configured to produce an effect on the surround, wherein for each effector at least one of the plurality of sensors senses the effect of the effector on the surround; and a plurality of actions each having an external state, a level, and a grade, and being configured to execute a co-exclusion of two of the concurrent threads,
the external state being determined at least in part by the states of one or more of the sensors,
the level representing the number of the co-exclusions beneath the action in the hierarchy, and
the grade representing the number of sensors whose states determine the external state of the action,
the plurality of actions being arranged in a hierarchy wherein each of the plurality of actions is a node in the hierarchy;

wherein:
a bottom level of the hierarchy comprises either or both of: one or more of the sensors; and one or more of the effectors;
the plurality of Actions are arranged in the hierarchy in order to carry out one or more goals, the one or more goals modifying the space-like computation from a current state to a goal state based on one or more impulses in the surround, the plurality of Actions propagating each of the one or more impulses upward through the hierarchy and each of the one or more goals downward through the hierarchy, one or more of the plurality of Actions being configured to cause one or more of the effectors to produce the corresponding effect on the surround; and
the computing device uses co-exclusion between pairs of sensors and pairs of Actions to automatically self-organize the plurality of Actions into one or more subsumption architectures that respond to the surround;

and wherein each of the one or more impulses is introduced from the surround to the space-like computation as an inversion of the state of a receiving sensor of the plurality of sensors, and wherein the plurality of Actions carry out the goal by, upon introduction of the one or more impulses, updating their external states as needed to:
perform a bubble up process that communicates the states of one or more of the plurality of sensors from a bottom level of the hierarchy upward to at least one level of the hierarchy higher than the bottom level, the bubble up process creating a trail for each of the one or more impulses, the trail comprising the Actions that updated their external states while communicating the states of the one or more of the plurality of sensors upward; and
perform a trickle down process that communicates, by retracing the trail of the bubble up process, one or more subgoals from one or more levels of the hierarchy higher than the bottom level downward to the one or more Actions that cause the one or more effectors to produce the effect as identified by the corresponding subgoal, the one or more subgoals together forming the goal.

7. The computing device of claim 6, wherein the nodes of the hierarchy include parent nodes, child nodes to the parent nodes, and top nodes that are parent nodes and are not child nodes, and wherein the threads associated with each one of the Actions are arranged in a plurality of sets including:

a first set comprising threads that perform the bubble up process by:
detecting a change occurring in one or more of the sensors or in one or more originating Actions of the plurality of Actions, the one or more originating Actions being at a level of the hierarchy below the Action and being the first of the plurality of Actions to detect the inversion of the state of the receiving sensor;
updating the external state of the Action according to the change; and
if the node of the Action is one of the child nodes, communicating the change upward to the Action of the node's parent node;

a second set comprising threads that perform a distributed back-chaining process which, if the Action is not grounded, adds to a tree of potential causal links from the originating Action to one of the Actions that is grounded and has the same level as the originating Action, the tree including zero, one, or more links to other Actions of the plurality of Actions, the other Actions being ungrounded and having the same level as the originating Action; and a third set comprising threads that, provided the Action is grounded, perform the trickle down process by:
detecting, from one of the levels of the hierarchy above the Action, a first of the subgoals that identifies the Action;
splitting the first subgoal into second and third subgoals;
communicating the second subgoal to one of the child nodes and the third subgoal to the other of the child nodes; and
instigating further execution of any chain that links to the Action and is waiting for the Action to execute.

8. The computing device of claim 7, wherein one or more of the co-exclusions pertain to an element of the surround and, when one of the one or more impulses relates to the element, the one or more originating Actions contain the threads that are subject to the co-exclusions of the element, which one or more originating Actions then initiate the bubble up process.

9. The computing device of claim 7, wherein the goal state of the space-like computation is connected to the current state of the space-like computation at an intersection of a vertical aspect with a horizontal aspect, the vertical aspect comprising the bubble up process and the trickle down process, and the horizontal aspect being determined by the distributed back-chaining process.

10. The computing device of claim 9, wherein the horizontal aspect corresponds to one of the levels of the hierarchy.

11. The computing device of claim 9, wherein in the distributed back-chaining process:
a first of the Actions, which is not grounded, which comprises a first of the co-exclusions that includes a first of the plurality of sensors and the receiving sensor of a first of the one or more impulses, and which has the receiving sensor of the first impulse in a first of its child nodes, uses its second set of threads to issue a first new impulse of the one or more impulses, the first new impulse identifying the first sensor as the receiving sensor for the first new impulse;

a second of the Actions, which has the same level as the first Action, and which comprises a second of the co-exclusions that includes the first sensor and a second of the plurality of sensors:
  detects the first new impulse;
  adds to the tree by allowing the first Action to link to it; and
  if the second Action is not grounded, uses its second set of threads to issue a second new impulse of the one or more impulses, the second new impulse identifying the second sensor as the receiving sensor of the second new impulse;
the distributed back-chaining process repeating the steps of the second Action using other of the plurality of Actions until the most recent of the new impulses is detected by one of the Actions that is grounded.

12. The computing device of claim 11, wherein the distributed back-chaining process creates a plurality of backward chains of causal links between two of the plurality of Actions, the plurality of backward chains forming the tree, and wherein execution of each of the backward chains is kept in abeyance until the one or more causally prior subgoal states required by the backward chain is issued by one of the Actions that is grounded and has a higher level than the Actions of the backward chain.

13. The computing device of claim 11, wherein:
when the node of the first Action is not one of the top nodes, the first Action performs the bubble up process by issuing one of the impulses that triggers the distributed back-chaining process for the Actions in the next higher level of the hierarchy; and
each of the Actions whose node is one of the top nodes performs the trickle down process by:
  converting one or more of the one or more impulses into one or more of the one or more goals; and
  communicating the one or more of the one or more goals to the child nodes of the Action.

14. The computing device of claim 11, wherein any of the plurality of Actions that are grounded are viewable by a monitor, the monitor being unable to, by viewing various ones of the plurality of Actions that are grounded, derive information about any of the plurality of Actions that: are in the hierarchy below the various ones of the plurality of Actions that are grounded; and are connected to the various ones of the plurality of Actions that are grounded.

15. The computing device of claim 6, further configured to perform a recall operation in response to a request from a user of the computing device for a fact known to the space-like computation, in which recall operation:
the computing device instantiates a devoted event window, the devoted event window containing the fact; and
the computing device generates a recall impulse as one of the impulses, the recall impulse setting the goal state such that the bubble up process produces one or more Relevance indicators that ground one or more of the first Actions.

16. The computing device of claim 15, wherein the space-like computation discovers novel processes by using the devoted event window to insert one or more new subgoals related to the recalling of the fact.

17. The computing device of claim 6, wherein the space-like computation implements an avatar structure that represents a human user in a virtual world, in which space-like computation:
the plurality of Actions comprise a plurality of system-supplied Actions that implement the avatar structure and are supplied to the space-like computation by a system designer;
the sensors and the effectors that are contained in the plurality of system-supplied Actions comprise an interface to the virtual world in which the avatar structure operates;
one or more of the impulses are passed into the space-like computation by the user; and
the avatar structure is anchored to the public or personal identity of the user.

18. The computing device of claim 6, further configured to:
detect a pattern in the space-like computation that indicates a set of processes that is locked in a closed cyclic pact;
identify the Actions participating in the pact;
relieve the pact by temporarily removing the subgoals and the impulses on which the Actions participating in the pact are operating; and
reestablish the removed subgoals and impulses after a fitting period of time.

19. The computing device of claim 6, wherein each of the plurality of Actions further comprises a name that is known to the space-like computation and unknown to the surround.

20. The computing device of claim 19, wherein each of the plurality of Actions further comprises two child nodes that are also Actions, and wherein each Action's name is derived from the names of the Action's child nodes in a manner that prevents the names of the child nodes being derived from the name of the Action.

21. The computing device of claim 6, wherein each of one or more tuples in the tuple space includes one or more security bits that can be set to deny matches of unbound fields to the tuple or to one or more fields of the tuple.

* * * * *